United States Patent
Gopalakrishnan et al.

(10) Patent No.: US 6,735,695 B1
(45) Date of Patent: May 11, 2004

(54) METHODS AND APPARATUS FOR RESTRICTING ACCESS OF A USER USING RANDOM PARTIAL BIOMETRICS

(75) Inventors: Ponani S. Gopalakrishnan, Yorktown Heights, NY (US); Dimitri Kanevsky, Ossining, NY (US); Stephane Herman Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/467,581

(22) Filed: Dec. 20, 1999

(51) Int. Cl.[7] .................................................. H04L 9/32
(52) U.S. Cl. ...................................... 713/186; 713/200
(58) Field of Search ................................... 713/186, 200

(56) References Cited

U.S. PATENT DOCUMENTS

| | | | |
|---|---|---|---|
| 5,677,989 A | * | 10/1997 | Rabin et al. ................ 704/246 |
| 5,764,789 A | * | 6/1998 | Pare et al. ................... 382/115 |
| 5,815,252 A | * | 9/1998 | Price-Francis ............... 356/71 |

OTHER PUBLICATIONS

Aaron E. Rosenber, Chin–Hui Lee, and Frank K. Soong, "Sub–Word Unit Talker Verification Using Hidden Markov Models", 1990 International Conference on Acoutics, Speech and Signal Processions. Apr. 3–6, 1990. pp. 269–272.*

Vishvjit S. Nalwa, "Automatic on–Line Signature Verification," Proceedings of IEEE, pp. 215–239, Feb. 1997.

* cited by examiner

*Primary Examiner*—Gregory Morse
*Assistant Examiner*—Jacob Lipman
(74) *Attorney, Agent, or Firm*—Ryan, Mason & Lewis, LLP; Thu Ann Dang, Esq.

(57) ABSTRACT

A biometrics security method and apparatus are disclosed that restrict the ability of a user to access a device or facility using a portion of biometric data to validate the user's identity. Upon a user request to access a secure device or facility, the central biometric security system initially sends a first request for a specific sample of a portion of the user's biometric information. The specific sample may be identified, for example, using a set of image coordinates. A second request is also sent to retrieve the biometric prototype from a database of registered users. The central biometric security system then compares the user biometrics portion with the corresponding biometrics prototype portions. The user receives access to the requested device if the user biometrics portion(s) matches the corresponding biometrics prototype portions. In one variation, the biometric security system transmits a security agent to the user's computing device upon a user request to access a remote device. The security agent serves to extract user biometric portions in accordance with the sampling request from the central biometric security system. In another variation, a local recognition is performed before a remote recognition to reduce the risk of a failed server side recognition due to a poor biometrics feature.

47 Claims, 8 Drawing Sheets

METHODS AND APPARATUS FOR RESTRICTING ACCESS OF A USER USING RANDOM PARTIAL BIOMETRICS

FIELD OF THE INVENTION

The present invention relates generally to access control techniques, and more particularly, to a method and apparatus for restricting access to a particular device or secure facility using random partial biometrics.

BACKGROUND OF THE INVENTION

Computers and other devices, as well as secure facilities, often contain proprietary and/or sensitive information, which could be compromised if accessed by unauthorized individuals. Thus, computer devices and secure facilities often incorporate security techniques, such as database access control mechanisms, to prevent unauthorized users from accessing, obtaining or altering the proprietary and/or sensitive information. Authentication techniques allow users to prove their identity and obtain authorized access to a given device or secure facility.

A number of authentication protocols have been developed to prevent the unauthorized access of such devices or locations. For example, access control mechanisms typically utilize some variation of an alphanumeric personal identification number (PIN) or password, that is presumably known only to the authorized user. Upon attempting to access a given device or physical location, the user enters the appropriate password, to establish his or her authority. Many users select a PIN or password that is easy to remember. Thus, there is a significant risk that such passwords may be guessed or otherwise compromised, in which case an attacker can access the given device or location.

To minimize the risk that a password will be compromised, the number of login attempts that may be attempted are often limited, so that an attacker cannot keep trying different passwords until successful. In addition, users are often encouraged or required to change their password periodically. One-time passwords have also been proposed to further increase security, where users are assigned a secret key that may be stored, for example, on a pocket token or a computer-readable card. Upon attempting to access a desired device or location, a random value, referred to as a "challenge," is issued to the user. The pocket token or computer-readable card then generates a "response" to the challenge by encrypting the received challenge with the user's secret key. The user obtains access to the device or location provided the response is accurate. In order to ensure that the pocket token or computer-readable card is utilized by the associated authorized user, the user typically must also manually enter a secret alphanumeric PIN or password.

While such authentication tools reduce the risk of unauthorized access to equipment or facilities, they suffer from a number of limitations, which if overcome, could dramatically increase the utility and effectiveness of such tools. For example, the requirement that the user must carry the pocket token or computer-readable card may not be practical for widespread deployment. Thus, a number of security systems that do not rely on a pocket token or computer-readable card have been developed.

For example, a number of access control mechanisms have secured access to devices or secure locations by evaluating biometric information, such as fingerprints, retinal scans or voice characteristics. For a more detailed discussion of such biometric-based access control systems, see, for example, U.S. Pat. No. 5,897,616, entitled "Apparatus and Methods for Speaker Verification/Identification/Classification Employing Non-Acoustic and/or Acoustic Models and Databases," U.S. patent application Ser. No. 09/008,122, filed Jan. 16, 1998, entitled "A Portable Information and Transaction Processing System and Method Utilizing Biometric Authorization and Digital Certificate Security," and U.S. patent application Ser. No. 09/417,645, filed Oct. 14, 1999, entitled "System and Method for Providing Secure Financial Transactions," each assigned to the assignee of the present invention and incorporated by reference herein.

Unfortunately, however, the transmission of biometric information over a network can be computationally expensive and consume significant network bandwidth. This is especially true when the biometric information must be transmitted in an encrypted format. A need therefore exists for an improved access control mechanism that uses biometric information to identify (or verify the identity of) a person who is requesting access to a secured device or location. A further need exists for an access control mechanism based on biometric information that minimizes the consumption of network resources.

SUMMARY OF THE INVENTION

Generally, a biometric security method and apparatus are disclosed that restrict the ability of a user to access a device or facility. The biometric security system uses biometric data about the user, to identify (or verify the identity of) the user. According to one aspect of the invention, only a portion of the biometric data is used to validate the identity of the user. The user biometric data can include fingerprints, voice characteristics, facial characteristics, handwriting characteristics, tissue characteristics, gestures and any other known biometric data.

Upon a user request to access a secure device or facility, a portion of digitized user biometric data is sent to a central biometric security system to identify (or verify the identity of) the user. The portion of the digitized user biometric data can include a portion of a digitized image, for example, when the biometric data consists of a fingerprint, facial characteristic or handwriting characteristic, or a portion of speech segments when the biometric data consists of voice characteristics. Since only a random portion of the potentially confidential biometric information is being transmitted, the present invention allows the biometric portions to be transmitted over unsecured communication lines, and even if captured by an eavesdropper, the full biometric image is not obtained.

The disclosed biometric security system initially sends a first request for a specific sample of a portion of the biometric information of the user. The specific sample may be identified, for example, using a set of image coordinates. In response to the first request, a sampling of the user biometric information, referred to herein as a biometric portion, is obtained. A second request is also sent to retrieve a biometric prototype associated with the user from a database of registered users. In response to the second request, a corresponding sample of the user biometric portions is extracted from the biometric prototype stored for the user. The central biometric security system then compares the user biometric portion with the corresponding biometric prototype portion. The user is permitted to access the requested device if the user biometric portion(s) matches the corresponding biometric prototype portion(s).

In one variation, the biometric security system of the present invention transmits a security agent to the user's computing device upon a user request to access a remote device. The security agent serves to extract user biometric portions in accordance with the sampling request from the central biometric security system.

In another variation, a local recognition is performed before a remote recognition to reduce the risk of a failed server side recognition due to a poor biometric feature. Upon a user request to access a remote device, the central biometric security system initially requests a user biometric portion from the biometric sensor unit. Thereafter, the central biometric security system obtains the user biometric prototype, for example, from a database server. The biometric sensor unit(or the computing device itself) then performs a local recognition (identification or verification of identity) or validation (validity of quality or acceptability of the extracted features) of the biometric data.

Once the biometric sensor unit has performed the local recognition or validation, the biometric sensor unit transmits the biometric portion(s) to the central biometric security system. The central biometric security system then compares the received user biometric portion(s) with the corresponding portions of the biometric prototype portion(s). The central biometric security system allows the user to access the requested remote device if the detailed comparison of the user biometric portion(s) and the biometric prototype portion(s) exceeds a predefined threshold.

A more complete understanding of the present invention, as well as further features and advantages of the present invention, will be obtained by reference to the following detailed description and drawings.

DETAILED DESCRIPTION OF PREFERRED EMBODIMENTS

Figure 1:
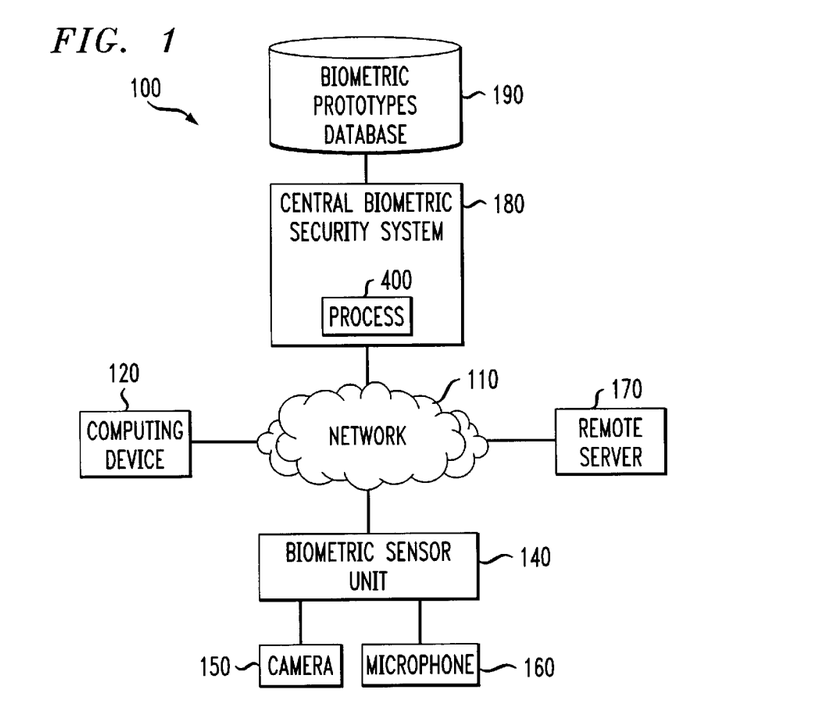
FIG. 1 illustrates a network environment in which the biometric security system of the present invention can operate.

FIG. 1 illustrates a network environment 100 in which the present invention can operate. As shown in FIG. 1, a central biometric security system 180 restricts the ability of a user operating a computing device 120 to access a device, such as a server 170, that is connected to the network 110. It is noted that while the illustrative embodiment of the present invention utilizes a remote biometric security system 180 to restrict access to a remote device 170, the present invention can likewise be applied to restrict access to a local device 170, or to a local secure facility, as would be apparent to a person of ordinary skill in the art.

The biometric security system 180 uses biometric data about the user, obtained from a biometric sensor unit 140, to verify the identity of the user. According to a feature of the present invention, only a portion of the biometric data is used to validate the user's identity. Biometric portions are discussed further below in conjunction with FIGS. 2A through 2D. The user biometric data is obtained, for example, from a camera 150 or microphone 160. While the biometric sensor unit 140 is shown as a separate device from the computing device 120, the biometric sensor unit 140 could be integrated in a single device with the computing device 120. The user biometric data can include fingerprints, voice characteristics, facial characteristics, handwriting characteristics, tissue characteristics, gestures and any other known biometric data. A biometric prototype database 190 records a biometric prototype for each registered user, in a known manner.

According to one feature of the present invention, a portion of the digitized user biometric data is sent to the central biometric security system 180 to validate the identity of the user. The portion of the digitized user biometric data can include a portion of a digitized image, for example, when the biometric data consists of a fingerprint, facial characteristic or handwriting characteristic, or a portion of speech segments when the biometric data consists of voice characteristics. In addition, since only a random portion of the potentially confidential biometric information is being transmitted, the present invention allows the biometric portions to be transmitted over unsecured communication lines. Furthermore, if an eavesdropper acquires a given biometric portion, the eavesdropper will not get the full biometric image. Network resources are conserved, since only a portion of the original biometric image is transmitted, and encryption is not required.

In one implementation, discussed further below, the central biometric security system 180 transmits a request to the biometric sensor unit 140 containing a sequence of random coordinate pairs corresponding to portions of the digitized image of the biometric information. In an alternate implementation, the central biometric security system 180 can request the biometric portion by specifying a particular feature of the digitized image of the biometric information. For example, the central biometric security system 180 can request specific features or regions to be dynamically determined, such as identified portions of a user's face (i.e, region around the lips or eyes) when the biometric data consists of images or video or identified portions of speech, for example, using word-order, when the biometric data consists of speech.

The biometric sensor unit 140 obtains the full biometric image, and extracts the content of pixels from the full image only at the identified coordinates (or feature) for transmission to the central biometric security system 180. For example, for each pixel, the biometric sensor unit 140 can determine whether the pixel has a binary logic value of zero (0) or one (1). The central biometric security system 180 compares the received portions of the full biometric image with the corresponding portions of the biometric prototype stored in the biometric prototype database 190 for this user. The user is permitted to access the requested device 170 if the biometric portions match.

A user operating a computing device 120 sends a request to access a remote server 170 over the network 110. Of course, the present invention can be applied to restrict the user's access to the computing device 120 itself. The user request activates the central biometric security system 180 to identify (or verify the identity of) the user. The process 400 performed by the biometric security system 180 is discussed further below in conjunction with FIG. 4. Generally, the biometric security system 180 will send a first request for a specific sample of user biometric portions to the biometric sensor unit 140. A second request is sent to the biometric prototype database 190 for a biometric prototype for the user.

In response to the first request, the biometric sensor unit 140 will capture a sample of the user biometric portions, in a manner discussed further below in conjunction with FIGS. 3A and 3B, and transmit the user biometric portions to the central biometric security system 180. In response to the second request, the biometric prototype database 190 extracts a sampling of user biometric portions from the biometric prototype stored in the database 190 for the user and transmits the sample of the biometric prototype portions to the central biometric security system 180.

It is noted that one or both of the transmitted samples of user biometric portions and sampling of user prototype biometric portions can be encrypted for additional security. Furthermore, the samples that are performed to obtain biometric portions can be selected randomly, in order that an eavesdropper could not learn the same sampling.

Thereafter, the central biometric security system 180 will compare the sample of user biometric portions with the corresponding sample of user prototype biometric portions and allow the user to access the requested remote device 170 if the selected user biometric portions match the user prototype biometric portions. It is noted that the central biometric security system 180 can export the comparison task to another server, such as sensor unit 140 or server 190, in the network environment 100.

Biometric Portions

Figure 2A:
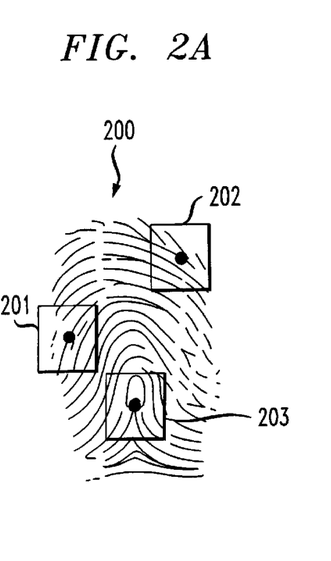
FIGS. 2A through 2D illustrate various representative biometric portions, in accordance with the present invention.
Figure 2B:
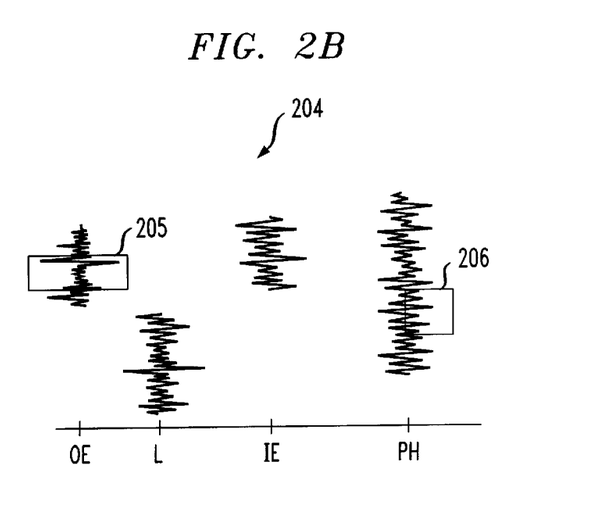
Figure 2C:
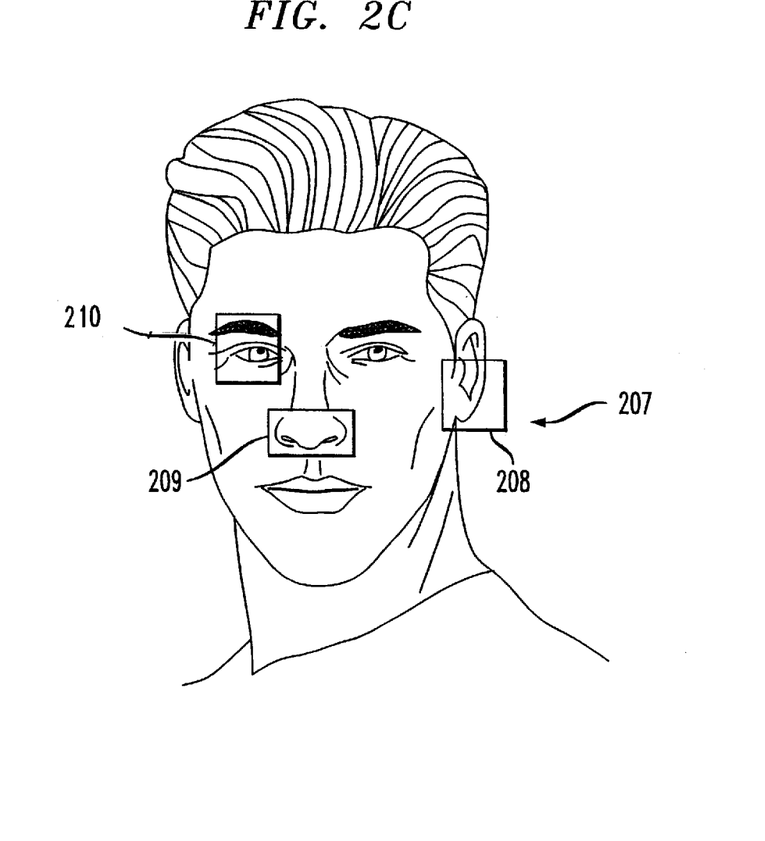
Figure 2D:
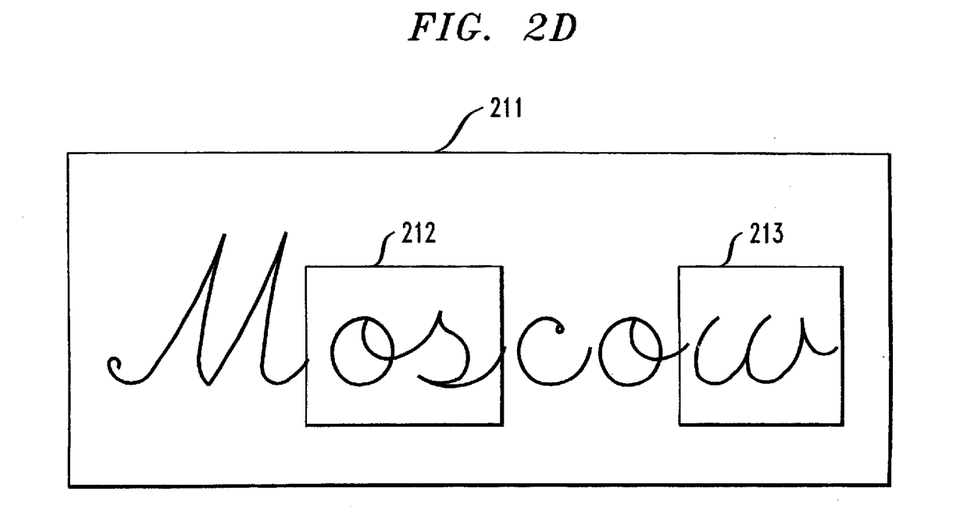

FIGS. 2A through 2D illustrate various representative biometric portions. As shown in FIG. 2A, biometric portions can include parts 201–203 of a fingerprint 200. Each part 201–203 is a small rectangular portion of the larger image 200. As shown in FIG. 2B, biometric portions can include sound sub-units that are represented as areas OE 205, and PH 206 of a spectogram 204, for a sequence of phones OE, L, IE, PH. In addition, biometric portions can include sound sub-units of a given speech phone, such as phone PH 206. For example, a sub-unit of a phone can include portions of a given phone or the whole cepstral feature vector within a phone. As shown in FIG. 2C, biometric portions can include parts 208–210 of a face picture 207. In addition, as shown in FIG. 2D, biometric portions can include parts 212, 213 of a written phrase 211. In alternate embodiments, biometric portions can also include parts of a picture of an eye, parts of spoken phrases, represented as PCM data, parts of cepstra and parts of gestures. As previously indicated, the biometric portion can be explicitly specified by the central biometric security system 180, for example, by specifying certain pixels to include in the biometric portion, or can be dynamically determined for example, by specifying certain features, such as lips or eyes, to include in the biometric portion.

Biometric Prototypes

User biometric prototypes represent an invariant form or transformed version of user biometrics or typical forms of user biometrics. For example, biometric prototypes can represent canonical forms, such as images captured from a predefined point of view and printed in some canonical system of coordinates. In the case of fingerprints, biometric prototypes are images of fingers that were scanned when they were placed in some standard way. In the case of facial images, biometric prototypes are images from a predefined point of view, such as front or side. Biometric prototypes can be derivatives of user biometrics that represent stable, i.e., not changed with time, forms of biometrics, such as voice characteristics, facial characteristics, tissue characteristics, robust characteristics (similar in space), features of biometrics and invariant forms of biometrics.

Biometric prototype portions are obtained similar to user biometrics, and include, for example, parts of a fingerprint prototypes, sound sub-unit prototypes, parts of facial prototypes, parts of an eye prototypes, parts of spoken phrase prototypes, parts of handwriting, phrase prototypes, frames of gesture prototypes, or other biometric prototype portions associated with speech prototypes, such as parts of cepstra, frames of cepstra or frames of PCM. For a discussion of techniques for obtaining user biometrics, see, for example, U.S. Pat. No. 5,895,447, entitled "Speech Recognition Using Thresholded Speaker Class Model Selection or Model Adaptation," U.S. patent application Ser. No. 08/788,471, filed Jan. 28, 1997, entitled "Text Independent Speaker Recognition for Transparent Command Ambiguity Resolution and Continuous Access Control," U.S. patent application Ser. No. 08/851,982, filed May 6, 1997, entitled "Speaker Recognition Over Large Population With Fast and Detailed Matches," U.S. patent application Ser. No. 08/787,029, filed Jan. 28, 1997, entitled "Speaker Model Prefetching," each assigned to the assignee of the present invention and incorporated by reference herein.

The request for a special sample can include coordinates of portions of a biometric that are represented as a domain in a multi-dimensional vector space. For example, a request for a fingerprint sampling from the fingerprint 200 of FIG. 2A, is represented as three coordinates of centers of squares 201–203. The size of each square 201–230 can also be included in the request. Another example of a request are coordinates of one or more pixels in a biometric that is represented as a domain in a multi-dimensional vector space. For example, as previously indicated, coordinates can be dynamically chosen as pixels in some facial area, for example, that covers an eye or hairs. The content of such a pixel is a color of the coordinate point that represents eye or hair color.

In addition, the biometric security system 180 can request a set of phones from a spoken phrase. For example, if a user password is a spoken phrase, the speech content corresponding to phones can be used to verify the identity of the user. The speech content can be represented, for example, as PCM or cepstral segments corresponding to time intervals for these phones. These time intervals can be identified using speech alignment techniques, such as those described in F. Jelenek, "Statistical Methods for Speech Recognition," (MIT Press, MA, 1998) or using a ballistic labeler, such as the one described in U.S. patent application Ser. No. 09/015,150, filed Jan. 29,1998, entitled "Apparatus and Method for Generating Phonetic Transcriptions From Enrollment Utterances," each incorporated by reference herein.

In a further variation, the biometric security system 180 can request speech data segments using a set of sub-phones, phones or classes of phones. Image biometric portions can be requested, for example, as coordinates of fingerprint sub-areas, coordinates of pixels of fingerprints, coordinates of facial sub-areas, coordinates of pixels of a facial area, coordinates of eye sub-areas, coordinates of pixels of an eye area. Similarly, requests for gesture samples can be obtained by sending time moments indicating when the gesture samples should be taken. For a discussion of a system for performing a multimedia (audiovideo) user recognition, see, for example, U.S. patent application Ser. No. 09/369,706, filed Aug. 6, 1999, entitled "Methods and Apparatus for Audio-Visual Speaker Recognition and Utterance Verification," assigned to the assignee of the present invention and incorporated by reference herein.

Figure 3A:
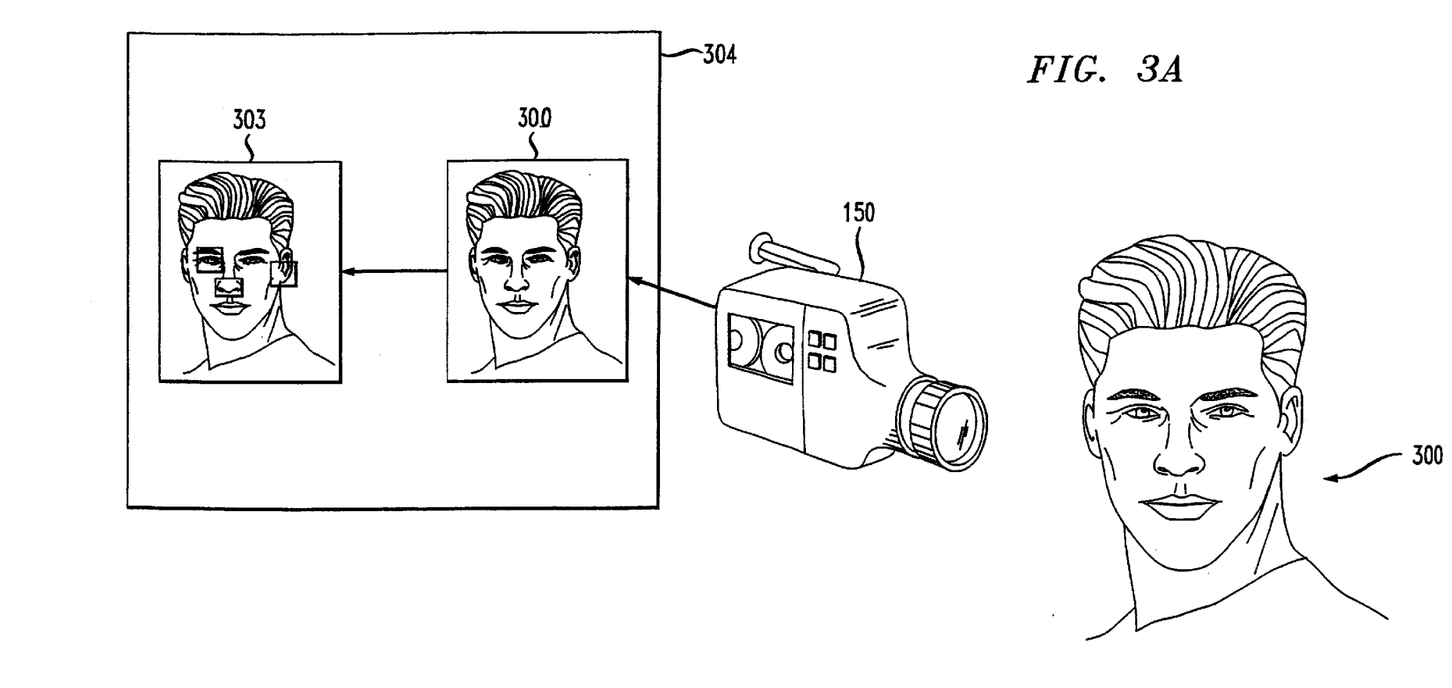
FIGS. 3A and 3B illustrate the sampling of biometric data to obtain biometric portions, in accordance with the present invention.
Figure 3B:
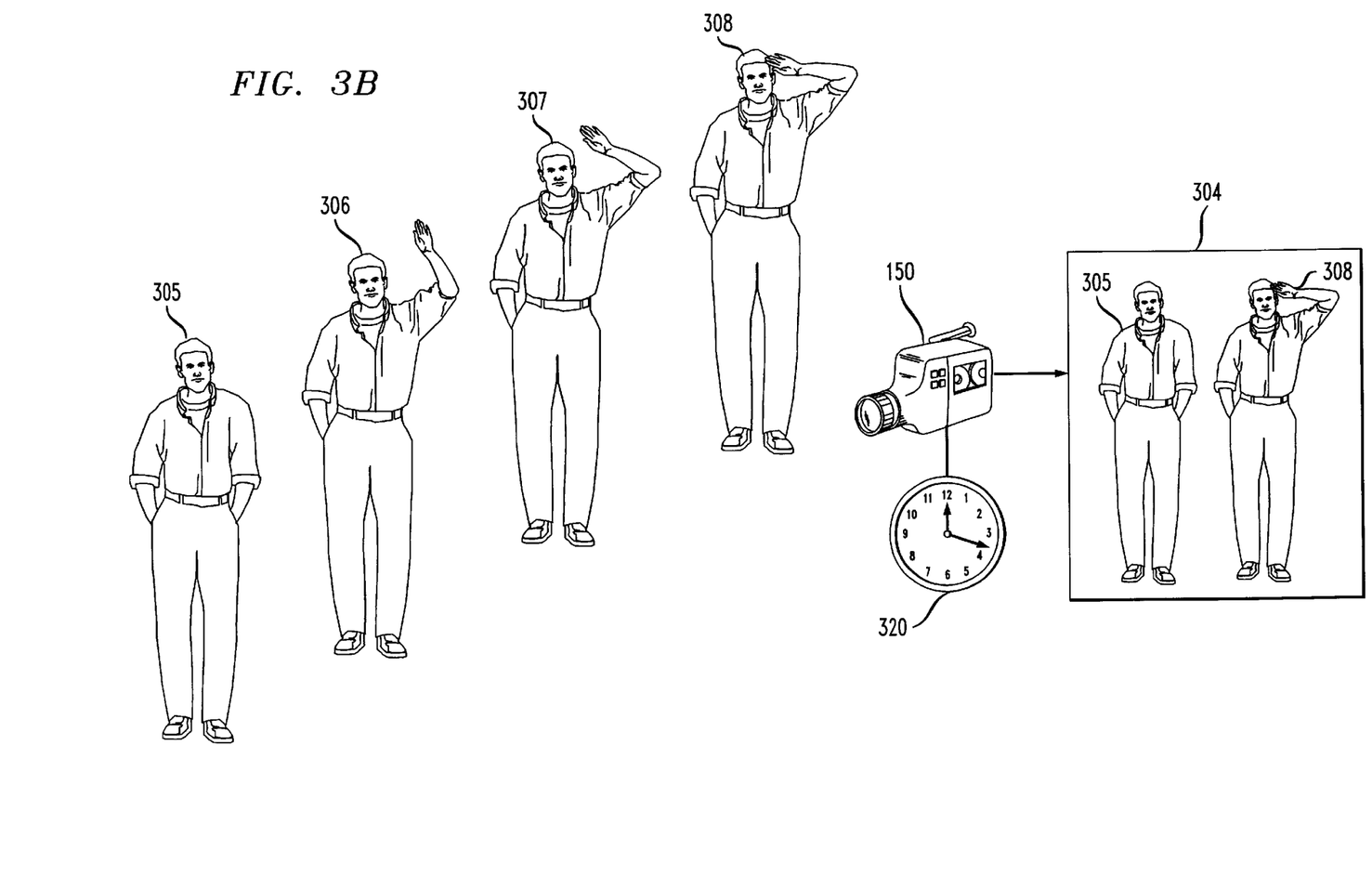

FIGS. 3A and 3B illustrate the sampling of biometric data to obtain biometric portions. In one implementation, the sampling of the biometrics of a user can involve obtaining an image of an entire user pattern, such as a complete fingerprint, facial image or voice sample, using sensors 150, 160. Thereafter, the desired portions of the biometric data can be extracted from the entire image. For example, as shown in FIG. 3A, the camera 150 can obtain an entire image 300 of the face of a user. Thereafter, the desired portions 303 of the facial image 300 can be extracted using a computer 304.

In one implementation, the sampling of the biometrics of a user can be achieved using time-sampled sensors. For example, as shown in FIG. 3B, the camera 150 can capture selected images of a person moving through positions 305-308. The camera 150 can be sampled using a clock 320 at desired instances to obtain biometric portions 305, 308. This implementation permits the utilization of gesture passwords. For a more detailed description of gesture passwords, see, for example, U.S. patent application Ser. No. 09/079,754, filed May 15, 1998, entitled "Apparatus and Method for User Recognition Employing Behavioral Passwords," assigned to the assignee of the present invention and incorporated by reference herein. Generally, gesture passwords consist of some predefined movements, such as touching a nose, jumping and turning left. If the camera 150 captures images at predefined moments, the gesture frames can be evaluated in the gesture password.

Biometric portions can also be obtained by transforming the image of a user pattern, for example, rotating the image of a fingerprint or a facial image. Such transformations may be desirable, for example, if captured images do not have a canonical form in which prototype images were obtained. For example, transformations may be required to compare a user signature on a check with a user signature stored, for example, on a credit card or smart card. The comparison is typically performed by a terminal in a retail store and often requires some transformation of the user signature on the check, such as scaling, to fit the user signature to the prototype signature that has been recorded on the credit card or smart card. Once the comparison has been performed locally at the retail store, some portions of the user transformed signature can be transmitted over the network 110 to a central verification service 180. In this manner, the local recognition can validate the appropriate transformation.

It is further noted that transformations, such as rotation or encryption, can be applied to the biometric data before the biometric portion is extracted. The transformation can be specified in advance or included in the request for the biometric portion from the central security system 180 (or agent 600, discussed below in conjunction with FIG. 6). For a discussion of biometric encryption techniques, see, for example, U.S. patent application Ser. No. 09/240,214, filed Jan. 29, 1999, entitled "A Biometric Authentication System With Encrypted Models," assigned to the assignee of the present invention and incorporated by reference herein.

Processes

Figure 4:
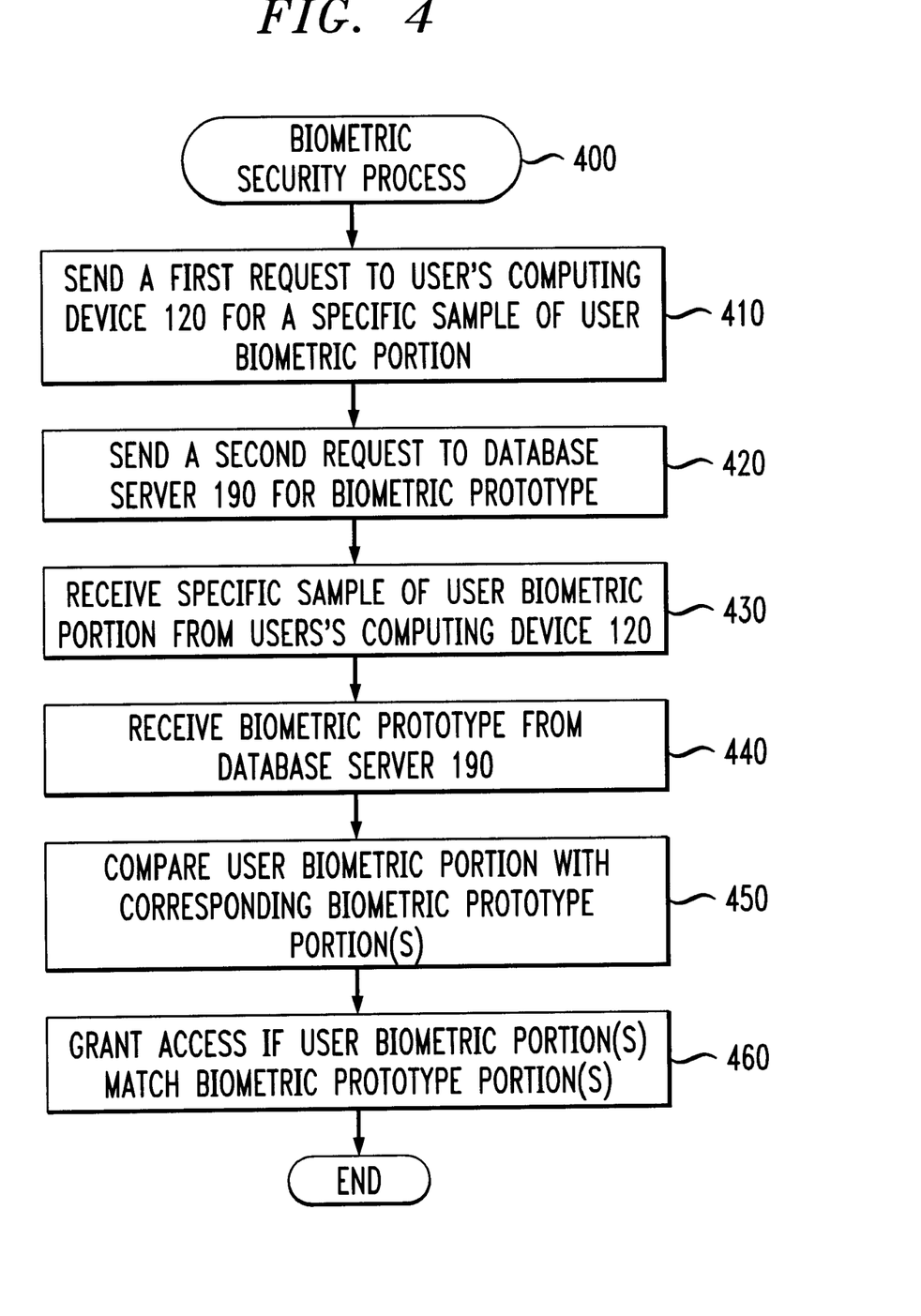
FIG. 4 is a flow chart describing an embodiment of the biometric security process in accordance with the present invention.

FIG. 4 is a flow chart describing an implementation of the present invention from a process point of view. As shown in FIG. 4, a first request is initially sent to the user's computing device 120 during step 410 for a specific sample of a portion of the user's biometric information. A second request is then sent to the database server 190 for the biometric prototype of the user during step 420.

The central biometric security system 180 then receives the specific sample of the user biometric portion during step 430 from the user's computing device 120. In addition, the central biometric security system 180 receives the corresponding biometric prototype from the database server 190 during step 440.

The central biometric security system 180 compares during step 450 the user biometric portion retrieved from the user device 120 with the corresponding biometric prototype portions received from the database 190. The user receives access to the requested device 170 during step 460 if the user biometric portion(s) matches the corresponding biometric prototype portions. Thereafter, program control terminates.

Figure 5:
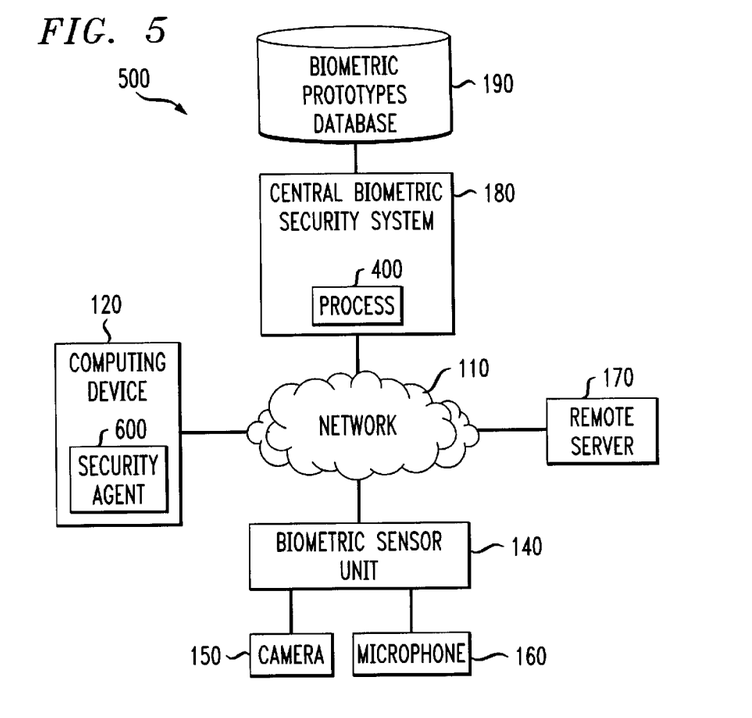
FIG. 5 illustrates an alternative implementation of the biometric security system of FIG. 1.

FIG. 5 illustrates an alternate implementation of the biometric security system of FIG. 1. In the biometric security system 500 of FIG. 5, upon a user request to access a remote device, the central biometric security system 180 transmits a security agent 600, discussed further below in conjunction with FIG. 6, to the computing device 120. In accordance with the present invention, the security agent 600 extracts user biometric portions in accordance with the sampling request from the central biometric security system 180. The illustrative security agent 600 is transmitted to the computing device 120 with a sampling string of phones associated with time intervals, in accordance with a sampling request. In addition, the security agent 600 includes the process shown in FIG. 6 to perform a set of procedures to capture the desired user biometric portions.

Figure 6:
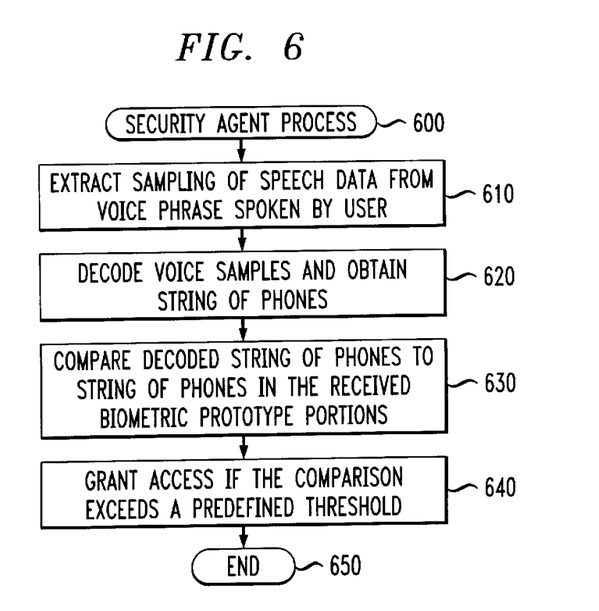
FIG. 6 is a flow chart describing an alternative embodiment of the biometric security process in accordance with the present invention.

Specifically, as shown in FIG. 6, the security agent 600 initially uses the microphone 160 to extract a sampling of speech data from a voice phrase spoken by the user during step 610. Thereafter, the security agent decodes the voice samples and obtains a string of phones during step 620. The decoded string of phones is compared by the agent 600 during step 630 to the string of phones in the biometric prototype portions that was received over the network 110. If the comparison exceeds a predefined threshold, the user is granted access to the requested remote device 170 during step 640, before program control terminates during step 650.

Figure 7:
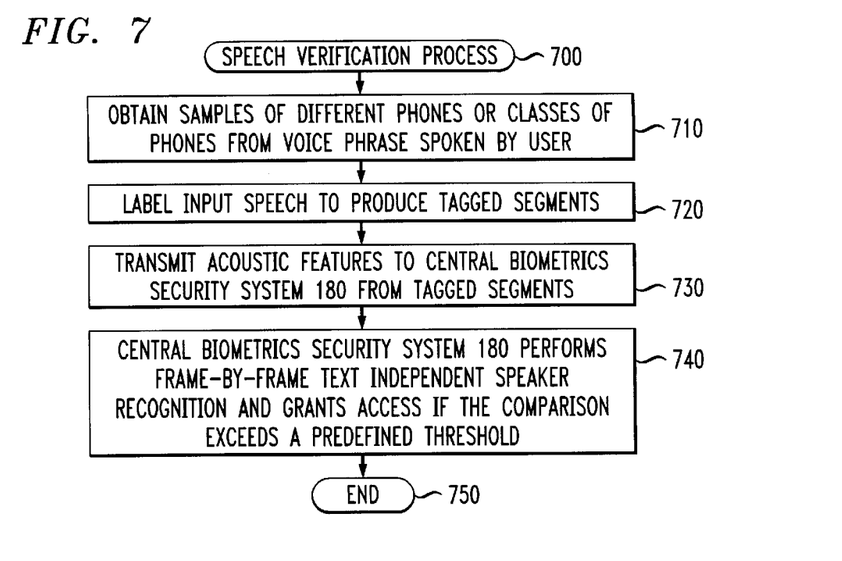
FIG. 7 is a flow chart describing an alternative embodiment of the biometric security process using speech biometric portions.

FIG. 7 is a flow chart describing another implementation of a biometric security method in accordance with the present invention. In the embodiment of FIG. 7, speech samples are converted locally at the user computing device 120, and the acoustic features are transmitted to the central biometric security system 180 for speech recognition and validation of the user's identity. As shown in FIG. 7, samples of different phones or classes of phones are initially obtained by the biometric sensor unit 140 during step 710 from voice phrases spoken by the user. Thereafter, the input speech is labeled during step 720 to produce tagged segments. The acoustic features are then transmitted to the central biometric security system 180 during step 730 from the tagged segments over the network 110. The device 120 can provide the central security system 180 with phones or portions of phones alignments (tags and time frames) using the speech recognition or ballistic labeling referenced above. The central biometric security system 180 then performs a frame-by-frame, text independent speaker recognition process to verify the identity of the speaker during step 740 and grants access if the comparison exceeds a predefined threshold. Program control terminates during step 750.

The text independent speaker recognition performed during step 740 may be performed using the methods and apparatus described, for example, in U.S. Pat. No. 5,895,447, entitled "Speech Recognition Using Thresholded Speaker Class Model Selection or Model Adaptation," U.S. patent application Ser. No. 08/788,471, filed Jan. 28, 1997, entitled "Text Independent Speaker Recognition for Transparent Command Ambiguity Resolution and Continuous Access Control," U.S. patent application Ser. No. 08/851,982, filed May 6, 1997, entitled "Speaker Recognition Over Large Population With Fast and Detailed Matches," U.S. patent application Ser. No. 08/787,029, filed Jan. 28, 1997, entitled "Speaker Model Prefetching," each assigned to the assignee of the present invention and incorporated by reference herein.

It is further noted that the speech features can be transmitted to the central security system 180 during step 730 in accordance with the protocols described in International Application Serial Number PCT/US99/22925, filed Oct. 1, 1999, entitled "system and Method for Providing Network Coordinated Conversational Services," and G. Ramaswamy and P. Gopalakrishnan, "Compression of Acoustic Features for Speech Recognition in Network Environment," Proc. ICASSP, 977-80 (1998), each incorporated by reference herein.

It is noted that the present invention can be applied to speech biometrics as well, where knowledge-based and acoustic-based speech recognition are simultaneously applied. For example, answers to questions can be constrained to always consist of the same sentence response, in which case the question is more mnemotechnic. Upon selection by the central biometric security system 180 of the phones to be sent as the biometric portions, based on the expected answer, the acoustic recognition can be performed as well as the speech recognition, by requesting time marks associated with each segment. Thus, if enough of the phones are in the right position and in the right order, the answer is deemed verified. For a more detailed discussion of a speaker identification system, see, for example, U.S. Pat. No. 5,897,616, entitled "Apparatus and Methods for Speaker Verification/Identification/Classification Employing Non-Acoustic and/or Acoustic Models and Databases," incorporated by reference above. It is noted that the user can change the order of his or her response, with a new sentence that contains the right attribute value in answer to the question. Access will be granted provided the phones (or portions thereof) are present in the correct order within each attribute.

It is further noted that if the present invention is used for enrollment, then different speakers may have models characterizing different phones. As a further extension, it is possible to perform discriminative training to determine for each speaker which subset of phones is optimal at discriminating the voice of the current speaker from other speakers.

Figure 8:
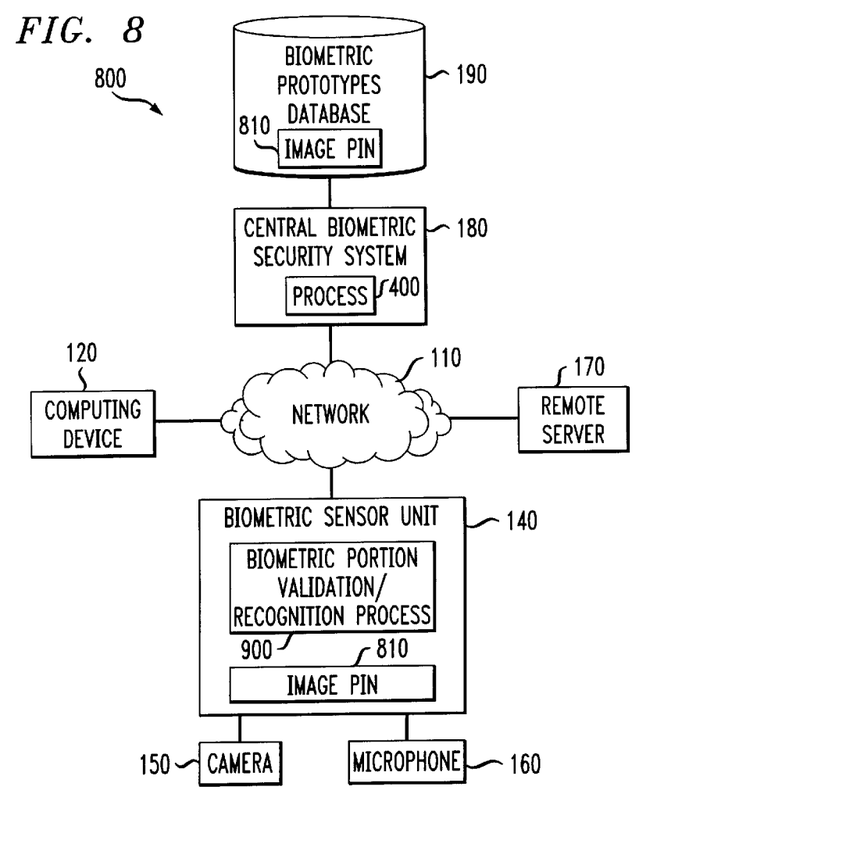
FIG. 8 illustrates an alternative implementation of the biometric security system of FIG. 1.

FIG. 8 illustrates an alternate implementation of the biometric security system of FIG. 1. In the biometric security system 800 of FIG. 8, upon a user request to access a remote device, the central biometric security system 180 communicates with the biometric sensor unit 140 to evaluate biometric portions, in accordance with the present invention, and additional security is achieved without consuming network resources by having the local biometric sensor unit 140 perform a more detailed comparison of the biometric data. The present embodiment is implemented using a biometric portion validation/recognition process 900, shown in FIG. 9.

Figure 9:
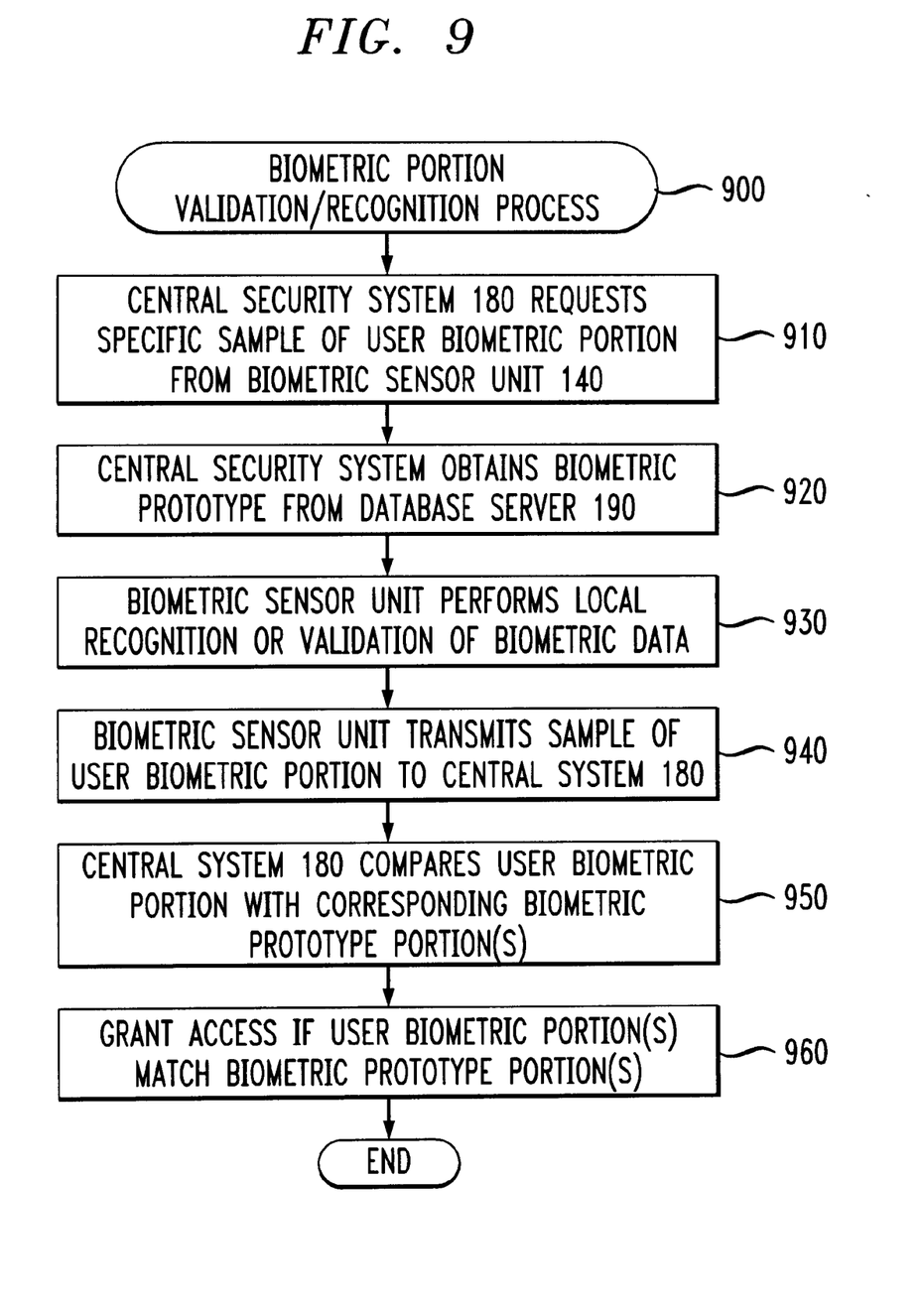
FIG. 9 is a flow chart describing an alternative embodiment of the biometric security process in accordance with the present invention.

As shown in FIG. 9, the central biometric security system 180 initially requests a user biometric portion from the biometric sensor unit 140 during step 910. As previously indicated, the request can be for an explicit portion of the overall biometric data or for a given feature, and the request can be sent directly by the central biometric security system 180 or using an agent. Thereafter, the central biometric security system 180 obtains the user biometric prototype from the database server 190 during step 920.

The biometric sensor unit 140 (or the computing device 120) then performs a local recognition (identification or verification of identity) or validation (validity of quality or acceptability of the extracted features) of the biometric data during step 930. The local recognition may be performed, for example, in accordance with the teachings of U.S. patent application Ser. No. 09/008,122, filed Jan. 16, 1998, entitled "A Portable Information and Transaction Processing System and Method Utilizing Biometric Authorization and Digital Certificate Security," assigned to the assignee of the present invention and incorporated by reference herein.

Once the biometric sensor unit 140 has performed the local recognition or validation, the biometric sensor unit 140 will transmit the biometric portion(s) to the central biometric security system 180 during step 940. The biometric portions can be transmitted to the central security system 180 during step 940 in accordance with the protocols described in International Application Serial Number PCT/US99/22925, filed Oct. 1, 1999, entitled "System and Method for Providing Network Coordinated Conversational Services," and G. Ramaswamy and P. Gopalakrishnan, "Compression of Acoustic Features for Speech Recognition in Network Environment," Proc. ICASSP, 977-80 (1998), each incorporated by reference herein.

The central biometric security system 180 then compares the received user biometric portion(s) with the corresponding portions of the biometric prototype portion(s) during step 950. Finally, the central biometric security system 180 will allow the user to access the requested remote device 170 during step 960 if the detailed comparison of the user biometric portion(s) and the biometric prototype portion(s) exceeds a predefined threshold. Program control then terminates.

The implementation shown in FIG. 9 performs a local recognition or validation before performing a remote recognition and thereby reduces the risk of a failed server side recognition due to a poor biometrics feature. In addition, the overall accuracy is improved while reducing network traffic. Incorrect samples are rejected locally before interacting with the central security system 180 to transmit the partial biometrics. In fact, the local recognition implementation of FIG. 9 can at low cost require multiple acquisition of the biometric features. Until a verification/identification is positive, the central biometric security system 180 will work with an acceptable set of biometric features (the features stored in the database 190).

In a further variation of a fingerprint or facial characteristic implementation, three small parts of a real biometric image, such as a fingerprint, are sent to the central biometric security system 180. These three base parts form a triangle and uniquely define a position of a finger on a fingerprint scanner. In this manner, the central biometric security system 180 can build a map from the image pin 810 stored in the database 190 to a real fingerprint that was scanned by the biometric sensor unit 140. The coordinates of an internal part of the fingerprint are then sent to the biometric sensor unit 140. Thus, an eavesdropper can obtain images of the three base parts of the fingerprint, but cannot obtain an interior of the fingerprint image.

Over time, an eavesdropper, having obtained many verifications of the same user, can eventually learn the whole image pin 810. To prevent the eavesdropper from obtaining the image pin 810 in this manner, a cryptographic hash function can be implemented, where the central biometric security system 180 sends a random challenge, C, to the biometric sensor unit 140. The challenge, C, gets appended to the image pin 810. Both sides compute a cryptographic hash of the result, as follows:

Hash(Cimage_pin).

The biometric sensor unit 140 sends its hash value to the central biometric security system 180, who compares for equality. The advantage is that the eavesdropper does not learn the values in the image pin 810, but rather only the result of these specific challenges. The cryptographic hash is set up in such a way that this information does not enable the eavesdropper to answer any future challenges. For a general discussion of cryptographic hash functions, see, for example, U.S. patent application Ser. No. 09/240,214, filed Jan. 29, 1999, entitled "A Biometric Authentication System With Encrypted Models," incorporated by reference herein.

It is noted that the communication overhead of this cryptographic hash implementation is small. The central biometric security system 180 sends the challenge, C, which may be 160 bits. The biometric sensor unit 140 sends its hash value, H, which may also be 160 bits. The computation on both sides can be larger. The biometric sensor unit 140 evaluates the image pin 810 against the real fingerprint.

It is to be understood that the embodiments and variations shown and described herein are merely illustrative of the principles of this invention and that various modifications may be implemented by those skilled in the art without departing from the scope and spirit of the invention.

What is claimed is:

1. A method for restricting access of a user, comprising the steps of:

obtaining a pattern of biometric information for said user;

selecting at least one portion of said pattern of biometric information for said user, wherein said selected at least one portion can identify said user and does not contain all of said biometric information;

obtaining a corresponding portion of a biometric prototype for said user; and providing access to said user if said selected at least one biometric information portion matches said corresponding biometric prototype portion.

2. The method of claim 1, wherein said obtained biometric information is a transformed version of biometric data.

3. The method of claim 1, wherein said selected at least one biometric information portion is an encrypted version of biometric data.

4. The method of claim 1, wherein said selected at least one biometric information portion is obtained in accordance with a set of image coordinates for a biometric image.

5. The method of claim 1, wherein said selected at least one biometric information portion is obtained in accordance with a set of pixels for a biometric image.

6. The method of claim 1, wherein said selected at least one biometric information portion is obtained in accordance with a request for one or more features in a biometric image.

7. The method of claim 1, wherein said selected at least one biometric information portion is obtained in accordance with a request based on the content of a biometric image.

8. The method of claim 1, wherein said obtained biometric information is obtained as a set of phones from a spoken phrase.

9. The method of claim 1, wherein said obtained biometric information is obtained as a set of speech tokens.

10. The method of claim 1, wherein said obtained biometric information is obtained as a set of speech attributes in response to a given question.

11. The method of claim 1, wherein said obtained biometric information is a biometric image.

12. The method of claim 1, wherein said obtained biometric information includes speech segments.

13. The method of claim 1, further comprising the step of encrypting said selected at least one biometric information portion before transmission.

14. The method of claim 1, further comprising the step of identifying said user based on said selected at least one biometric information portion.

15. The method of claim 1, further comprising the step of verifying the identity of said user based on said selected at least one biometric information portion.

16. The method of claim 1, wherein said selected at least one portion of said biometric information is selected randomly.

17. The method of claim 1, wherein said obtained biometric information are obtained using time-sampled sensors.

18. The method of claim 1, wherein said biometric prototype is captured from a predefined point of view and recorded in a canonical system of coordinates.

19. The method of claim 1, wherein said selected at least one biometric information portion is obtained by an agent executing on a computing device associated with said user.

20. The method of claim 19, wherein said agent extracts said selected at least one biometric information portion in accordance with a sampling request from a central security system.

21. A method for restricting access of a user, comprising the steps of:

obtaining a pattern of biometric information for said user;

selecting at least one portion of said pattern of biometric information for said user, wherein said selected at least one portion can identify said user and does not contain all of said biometric information;

processing said selected at least one biometric information portion on a computing device associated with said user to ensure that said selected at least one biometric information portion satisfies predefined criteria;

transmitting said selected at least one biometric information portion to a central server if said selected at least one biometric information portion satisfies said predefined criteria; and providing access to said user if said central server determines that said selected at least one biometric information portion matches a corresponding portion of a biometric prototype.

22. The method of claim 21, wherein said computing device associated with said user compares said selected at least one biometric information portion to a biometric image for said user from a recorded medium to identify said user.

23. The method of claim 21, wherein said computing device associated with said user compares said selected at least one biometric information portion to a biometric image for said user from a recorded medium to verify the identity of said user.

24. The method of claim 21, wherein said computing device associated with said user evaluates said selected at least one biometric information portion to ensure that the quality of said biometric information satisfies predefined criteria.

25. The method of claim 21, wherein said computing device associated with said user evaluates said selected at least one biometric information portion to ensure that extracted features of said selected at least one biometric information portion satisfies predefined criteria.

26. A method for restricting access of a user, comprising the steps of:

obtaining a set of speech samples of said user;

selecting at least one sub-unit of said speech samples to produce at least one tagged segment, wherein said selected sub-unit can identify said user and does not contain all of said speech samples;

transmitting said at least one tagged segment to a central security system; and receiving an authorization from said central security system to allow said access if said central security system verifies said at least one tagged segment match speech prototypes recorded for said user.

27. The method of claim 26, wherein said set of speech samples includes samples of different phones.

28. The method of claim 26, wherein said set of speech samples includes samples of classes of phones.

29. The method of claim 26, wherein said set of speech samples is obtained as a set of speech tokens.

30. The method of claim 26, wherein said set of speech samples is obtained as a set of speech attributes in response to a given question.

31. The method of claim 26, wherein said central security system employs a frame-by-frame, text independent speech recognition process.

32. The method of claim 26, wherein said central security system identifies said user based on said at least one tagged segment.

33. The method of claim 26, wherein said central security system verifies the identity of said user based on said at least one tagged segment.

34. The method of claim 26, wherein said set of speech samples is obtained as a set of phones from a spoken phrase.

35. A method for verifying the identity of an individual, said method comprising the steps of:

obtaining a pattern of biometric information for said individual;

selecting at least one portion of said pattern of biometric information for said individual, wherein said selected at least one portion can identify said user and does not contain all of said biometric information;

obtaining a corresponding portion of a biometric prototype for said individual; and verifying the identity of said individual if said selected at least one biometric information portion matches said corresponding biometric prototype portion.

36. The method of claim 35, wherein said biometric prototype is obtained based on a password.

37. The method of claim 35, wherein said biometric prototype is obtained based on a pocket token associated with said individual.

38. The method of claim 35, wherein said biometric prototype is obtained based on a computer-readable card associated with said individual.

39. A method for identifying an individual, said method comprising the steps of:

obtaining a pattern of biometric information for said individual;

selecting at least one portion of said pattern of biometric information for said individual, wherein said selected at least one portion can identify said user and does not contain all of said biometric information;

comparing said selected at least one biometric information portion to biometric prototypes for registered users; and identifying said individual if said selected at least one biometric information portion matches a corresponding biometric prototype portion.

40. A system for restricting access of a user, comprising:

a memory that stores computer-readable code; and a processor operatively coupled to said memory, said processor configured to implement said computer-readable code, said computer-readable code configured to:

obtain a pattern of biometric information for said user;

select at least one portion of said pattern of biometric information for said user, wherein said selected at least one portion can identify said user and does not contain all of said biometric information;

obtain a corresponding portion of a biometric prototype for said user; and provide access to said user if said selected at least one biometric information portion matches said corresponding biometric prototype portion.

41. A system for restricting access of a user, comprising:

a memory that stores computer-readable code; and a processor operatively coupled to said memory, said processor configured to implement said computer-readable code, said computer-readable code configured to:

obtain a pattern of biometric information for said user;

select at least one portion of said pattern of biometric information for said user, wherein said selected at least one portion can identify said user and does not contain all of said biometric information;

process said selected at least one biometric information portion on a computing device associated with said user to ensure that said selected at least one biometric information portion satisfies predefined criteria;

transmit said selected at least one biometric information portion to a central server if said selected at least one biometric information portion satisfies said predefined criteria; and provide access to said user if said central server determines that said selected at least one biometric information portion matches a corresponding portion of a biometric prototype.

42. A system for restricting access of a user, comprising:

a memory that stores computer-readable code; and a processor operatively coupled to said memory, said processor configured to implement said computer-readable code, said computer-readable code configured to:

obtain a set of speech samples of said user;

select at least one sub-unit of said speech samples to produce at least one tagged segment, wherein said selected sub-unit can identify said user and does not contain all of said speech samples;

transmit said at least one tagged segment to a central security system; and receive an authorization from said central security system to allow said access if said central security system verifies said at least one tagged segment match speech prototypes recorded for said user.

43. A system for verifying the identity of an individual, comprising:
- a memory that stores computer-readable code; and
- a processor operatively coupled to said memory, said processor configured to implement said computer-readable code, said computer-readable code configured to:
  - obtain a pattern of biometric information for said individual;
  - select at least one portion of said pattern of biometric information for said individual, wherein said selected at least one portion can identify said user and does not contain all of said biometric information;
  - obtain a corresponding portion of a biometric prototype for said individual; and
  - verify the identity of said individual if said selected at least one biometric information portion matches said corresponding biometric prototype portion.

44. An article of manufacture for restricting access of a user, comprising:
- a computer readable medium having computer readable code means embodied thereon, said computer readable program code means comprising:
  - a step to obtain a pattern of biometric information for said user;
  - a step to select at least one portion of said pattern of biometric information for said user, wherein said selected at least one portion can identify said user and does not contain all of said biometric information;
  - a step to obtain a corresponding portion of a biometric prototype for said user; and
  - a step to provide access to said user if said selected at least one biometric information portion matches said corresponding biometric prototype portion.

45. An article of manufacture for restricting access of a user, comprising:
- a computer readable medium having computer readable code means embodied thereon, said computer readable program code means comprising:
  - a step to obtain a pattern of biometric information for said user;
  - a step to select at least one portion of said pattern of biometric information for said user, wherein said selected at least one portion can identify said user and does not contain all of said biometric information;
  - a step to process said selected at least one biometric information portion on a computing device associated with said user to ensure that said selected at least one biometric information portion satisfies predefined criteria;
  - a step to transmit said selected at least one biometric information portion to a central server if said selected at least one biometric information portion satisfies said predefined criteria; and
  - a step to provide access to said user if said central server determines that said selected at least one biometric information portion matches a corresponding portion of a biometric prototype.

46. An article of manufacture for restricting access of a user, comprising:
- a computer readable medium having computer readable code means embodied thereon, said computer readable program code means comprising:
  - a step to obtain a set of speech samples of said user;
  - a step to select at least one sub-unit of said speech samples to produce at least one tagged segment, wherein said selected sub-unit can identify said user and does not contain all of said speech samples;
  - a step to transmit said at least one tagged segment to a central security system; and
  - a step to receive an authorization from said central security system to allow said access if said central security system verifies said at least one tagged segment match speech prototypes recorded for said user.

47. An article of manufacture for verifying the identity of an individual, comprising:
- a computer readable medium having computer readable code means embodied thereon, said computer readable program code means comprising:
  - a step to obtain a pattern of biometric information for said individual;
  - a step to select at least one portion of said pattern of biometric information for said individual, wherein said selected at least one portion can identify said user and does not contain all of said biometric information;
  - a step to obtain a corresponding portion of a biometric prototype for said individual; and
  - a step to verify the identity of said individual if said selected at least one biometric information portion matches said corresponding biometric prototype portion.

* * * * *